US008370037B2

(12) United States Patent
Stehle et al.

(10) Patent No.: US 8,370,037 B2
(45) Date of Patent: Feb. 5, 2013

(54) METHOD FOR THE PROTECTION OF AN AUTOMATICALLY ACTUATED CLUTCH OF A VEHICLE FROM OVERLOAD

(75) Inventors: Bjoern Stehle, Buehl (DE); Klaus Henneberger, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1743 days.

(21) Appl. No.: 11/166,321

(22) Filed: Jun. 24, 2005

(65) Prior Publication Data

US 2006/0004506 A1 Jan. 5, 2006

(30) Foreign Application Priority Data

Jun. 30, 2004 (DE) .......................... 10 2004 031 477

(51) Int. Cl.
*G06F 7/00* (2006.01)
*G06F 17/00* (2006.01)
*G06F 19/00* (2011.01)

(52) U.S. Cl. .......................................... 701/67; 701/51

(58) Field of Classification Search ................... 701/67, 701/51; 192/30, 31, 32, 48.7; 180/197, 338; 477/5–8, 12, 15, 34, 37, 39, 57, 70, 74, 77, 477/79, 83, 86, 87, 114, 115, 166–169, 171, 477/176, 179–181
See application file for complete search history.

(56) References Cited

U.S. PATENT DOCUMENTS

| 6,012,323 | A  | * | 1/2000 | Soderholm et al. | ............. 73/1.16 |
| 6,482,123 | B2 | * | 11/2002 | Steeby | ........................... 477/98 |
| 2003/0043032 | A1 | * | 3/2003 | Jung | ............................. 340/439 |
| 2004/0157704 | A1 | * | 8/2004 | Stork et al. | .................... 477/166 |

* cited by examiner

*Primary Examiner* — Thomas Tarcza
*Assistant Examiner* — Imran Mustafa
(74) *Attorney, Agent, or Firm* — Simpson & Simpson, PLLC

(57) ABSTRACT

A method for the protection of an automatically actuated clutch of a vehicle from overload, comprising the steps of determining a driving situation of the vehicle, continuously determining the energy input in the clutch, and, preventing or reducing an overload state via targeted intervention in vehicle management as a function of the determined driving situation and the input energy.

13 Claims, No Drawings

METHOD FOR THE PROTECTION OF AN AUTOMATICALLY ACTUATED CLUTCH OF A VEHICLE FROM OVERLOAD

CROSS REFERENCE TO RELATED APPLICATIONS

This patent claims priority of German Patent Application No. 10 2004 031 477.2 filed Jun. 30, 2004, which application is incorporated herein by reference.

FIELD OF THE INVENTION

The present invention relates to a method for the protection of an automatically actuated clutch of a vehicle against overload.

BACKGROUND OF THE INVENTION

Automatically actuated clutches of this type may be used on vehicles equipped with various transmissions. The differentiation of the transmission in this context involves not just the degree of automation, but also the type of design, so that the transmission may be, for example, an automated shift transmission, an uninterrupted shift transmission, a parallel shift transmission or a transmission having continuously variable change of the gear ratio. In such transmissions the clutch, in the form of a friction clutch, generally performs two functions, namely, the function of acting as a starting element and also the function of acting as a shift element.

Both when starting and when reestablishing the power transmission connection between the engine and the drive train after a gear change operation, a clutch torque is transmitted via the clutch when there is a speed differential between the input and output sides of the friction clutch. In this context, friction loss is inevitably brought into the clutch frictional surfaces as a product of clutch torque and differential angular velocity, which causes a temperature increase in the frictional surfaces and thus the clutch.

The wear of the clutch surfaces is a function of the amount of input energy and the temperature. In addition to a proper wear of the friction surfaces, there may also be secondary effects involved in the form of mechanical deformations of the friction surfaces and changes of the coefficient of friction of the friction surfaces, so that, for example, a drop in the coefficient of friction of the friction counterparts may result in an extension of the slip phase and, thus, in turn, an increase of the input energy.

It is therefore of fundamental significance, especially with dry clutches, not to let the input of energy in the clutch become too high.

In vehicles with automatically actuated clutches, the direct actuation of the clutch is taken away from the influence of the driver, but the driver through his driving style may have an influence on the wear behavior of the clutch.

Therefore, it is possible, for example, that a long-lasting creeping of the vehicle on an incline that is noticed by the driver, or even unnoticed, or a delayed starting behavior on an incline leads to an increased energy input in the clutch. Also, stopping the vehicle on an incline by using the accelerator pedal leads to an increased energy input into the clutch, this also being applicable, for example, for the case that the driver forgets that his parking brake is engaged when starting to drive.

In addition to these causes of increased energy input in the clutch that are brought about by the driver of the vehicle, errors in the system for actuating the automatic friction clutch may result in increased energy input, for example, because of a hydraulic line for clutch actuation being out of tune, due, for example, to a leak. These are all just examples of causes of an increased load in the form of an increased energy input in the friction clutch.

BRIEF SUMMARY OF THE INVENTION

On this basis, the object of the present invention is to create a method for the protection of an automatically actuated clutch of a vehicle against overload.

To achieve this objective, the invention has the features specified in claim 1. Advantageous embodiments thereof are described in the additional claims.

To achieve this objective, the invention provides a method for the protection of an automatically actuated clutch of a vehicle, whereby according to the method the driving situation of the vehicle is detected, the energy input into the clutch is continuously being detected and, as a function of the detected driving situation and the input energy, the overload state is prevented or reduced via a targeted intervention in the vehicle management.

Within the context of the present invention, the concept of determining the driving situation is understood to include the detection of the driving situation of the vehicle using existing vehicle parameters or ones to be introduced and also the monitoring of the detected driving situation for change, so that, as a function of the detected input of energy in the clutch, a selection among possibilities for intervention in the vehicle management for preventing or diminishing the overload state of the clutch may be made and the targeted intervention is carried out accordingly.

Therefore, it is possible, for example, within the context of detecting the driving situation of the vehicle, to carry out a classification of the driving situation and a monitoring of the determined driving situation.

In this connection, the invention provides, for example, for the determination of the driving situation to distinguish among at least the situations of creeping, starting off and driving and to carry out this determination to a great extent continuously or even intermittently in prescribed time intervals.

Slip states during a starting out operation or a creeping operation take on a great significance with regard to the input of energy in the automatically actuated clutch, so that it is provided according to a further development of the method of the invention in the starting out driving situation to differentiate between a starting out operation with a stationary vehicle and a starting out operation with a non-stationary vehicle, the engaged gear also being determined in this case. Therefore, for example, in a driving operation when the vehicle is stationary, a further subdivision may be made with regard to the engaged gear of whether the transmission is in first, second or another gear, such as reverse. Since a higher energy input in the friction clutch is also to be expected during a starting out operation on an incline, a detection of the driving situation of the vehicle may also be carried out in reference to existing vehicle parameters, such as an evaluation of the throttle angle or the accelerator pedal position or, for example, also an inclination sensor signal.

In this context, the invention provides that the energy input into the clutch is determined as the integral of the friction introduced into the clutch at any instant over time, according to the formula:

$$E_{Friction} = \int P_{Friction}(t)dt,$$

so that, at any instant and in any driving situation, the energy input into the clutch is known.

In this context, the friction loss, $P_{Friction}$, at any given time is a product of the current slip speed $\omega_{Slip}$ at the clutch and the current friction moment $M_{Friction}$ at the clutch, so that the friction loss turns out to be:

$$P_{Friction} = M_{Friction} \omega_{Slip} = M_{Friction} 2\pi n_{Slip}.$$

In this context, the friction moment being introduced in the determination of the input energy may thus be measured according to a continuation of the invention or be determined on the basis of clutch characteristic curves or also determined on the basis of existing parameters, such as the engine speed, the engine torque and the mass moment of inertia of the engine and of the clutch flywheel. In this way it is possible, for example, to determine the friction moment, $M_{Friction}$, according to the equation:

$$M_{friction} = M_{engine} - J_{engine} \dot{\omega}_{engine} = M_{engine} - J_{engine} 2\pi \dot{n}_{engine},$$

according to one embodiment of the method of the invention, the data required for determining the friction moment $M_{friction}$, namely engine speed $\dot{n}_{engine}$ and engine torque $M_{engine}$, being calculated via a bus system present in the vehicle, such as the CAN bus, and the mass moment of inertia of engine and flywheel $J_{engine}$ being known.

Therefore, since the friction moment at every instant considered is known, the energy input in the clutch at every instant considered may be determined.

DETAILED DESCRIPTION OF THE INVENTION

According to the invention, it is now provided that various targeted interventions in the vehicle management are made as a function of prescribed threshold values of the energy input in the clutch or of the expected input of energy in the clutch, it being possible to prescribe the threshold values or determine them as a function of the current temperature in the clutch. Thus, different interventions in the vehicle management may now be carried out as a function of the expected energy input depending on the determined driving situation or also as a function of the determined actual energy input in the friction clutch. In this context, it is possible to prescribe the threshold values as a function of the determined driving situation or also to calculate them as a function of the current temperature of the clutch so that, in the determination of the threshold values, the current load situation of the clutch may also be involved. Then, various interventions in the vehicle management may be carried out as a function of the calculated energy input thresholds.

Provided that, for example, the determined or expected energy input in the clutch leads to a clutch temperature of, for example, up to 250 degrees Celsius, a normal load situation of the clutch may be assumed, so that no interventions in the vehicle management are carried out up to this associated energy input threshold. As the temperature of the clutch rises, the tolerated energy input thresholds, which, when reached, trigger targeted interventions in the vehicle management, are reduced.

If a clutch temperature of, for example, 250 to 350 degrees Celsius is assumed based on the determined or expected energy input, then according to the invention comfort-reducing interventions in the vehicle management may be carried out, such as no longer carrying out a starting operation in second gear.

If the determined or expected energy input would lead to a clutch temperature of, for example, more than 350 degrees Celsius, an additional comfort-reducing intervention in the vehicle management is possible, such as a reduction of the engine torque output by the engine.

According to a further development of the invention, it is provided in this context that the interventions in the vehicle management may be carried out as a function of prescribed threshold values of an expected period of a slip condition of the vehicle clutch. Therefore, it is also possible to determine the energy input as a function of the duration of slipping state of the clutch.

Because the selection of the targeted interventions in the vehicle management is also determined as a function of the detected and monitored driving situation of the vehicle, the invention also provides that the particular intervention is carried out as a function of prescribed threshold values of the speed of the vehicle in order to prevent any safety-critical interventions in the vehicle management.

If it is determined according to the method of the invention, for example, that the vehicle in the driving situation of creeping mode is on an incline and the evaluation of the vehicle speed reveals that the speed is almost zero and the energy input threshold is exceeded so that an intervention in the vehicle management for clutch protection becomes necessary, in this situation for safety reasons neither may the clutch be disengaged, which would cause the vehicle to roll back in the opposite direction, nor may the clutch be engaged, because otherwise the vehicle would be set in motion, which possibly does not correspond to the driver's desire, so according to the invention the intervention in the vehicle management may look as if only an acoustic and/or optic and/or haptic indication is output to the driver of the vehicle, that is, for example, a visual warning appears in the display of the vehicle, an acoustic warning is output via a vehicle buzzer or a haptic warning in the form of an actively produced vehicle jerking is output to the driver in response to a corresponding actuation of the clutch.

According to a further development of the invention, it is also provided that, before carrying out the intervention in the vehicle management, a prescribable waiting period is set during which the presence of the condition for the intervention continues to be checked. During this time period, a corresponding acoustic and/or optic and/or haptic warning indication, for example, which indicates that the subsequent intervention in vehicle management is not a fault function but, rather, a clutch protection function, may also be output to the driver of the vehicle. If henceforth during this pre-warning time the checking of the continuing presence of the overload situation of the clutch reveals that—for example, because of a corresponding reaction of the driver of the vehicle to the pre-warning indication—the overload situation is no longer present, then according to the invention the otherwise required intervention in the vehicle management is either no longer carried out or an intervention in the vehicle management follows that, regarding its weighting, represents a less comfort-inhibiting measure, such as a brief blocking of the vehicle starting out in second gear, it being still possible for the vehicle to start out in first gear with a lower input of energy in the clutch.

Depending on the energy input threshold, different interventions in the vehicle management may therefore be introduced in the form of measures for reducing the load of the clutch. Examples of such measures depending on the determined vehicle situation are shown in the following table.

| Situation | Countermeasures | | | | | | | |
|---|---|---|---|---|---|---|---|---|
| | Deactivate Function | Disengage clutch | Engage clutch | Engine intervention | Stop engine | Stall engine | Brake intervention | Driver warning |
| Creeping on an incline (Vehicle speed slower than walking speed) | | | | | | | | X |
| Creeping on an incline (Vehicle stationary) | X | X | | | | | X | |
| Creeping on an incline (Vehicle speed faster than walking speed) | | | X | | | | | |
| Stopping the vehicle on an incline using accelerator pedal | | | X | | | | | X |
| Starting out | | | X | | | | | |
| Stall | | X | | | | | | |
| Stall | | | | | | X | | |
| Stall | | | | X | | | | |
| Driving in gear, clutch slips due to faulty torque tracking | | | X | | | | | |

In this context, the table shows just examples of targeted interventions in the vehicle management; thus, for example, after detecting the driving situation "creeping on an incline" and if this creeping operation has already caused a prescribed energy input threshold to be exceeded, a warning to the driver may be output such that, for example, an optic indication is given that the clutch of the vehicle is overloaded.

In the second example shown in the table, "Creeping on an incline while the vehicle is stationary", an effective intervention in the vehicle management may mean that the creeping function is deactivated, the clutch is disengaged to prevent an additional thermal load of the clutch, and at the same time there is a brake intervention that prevents the vehicle from rolling back. This example shows that the targeted intervention in the vehicle management may also comprise a sequence of a plurality of individual interventions.

If within the context of detecting the driving situation it is determined that the vehicle is in a creeping operation and the vehicle speed is already greater than a walking speed, then a targeted intervention to prevent a further thermal load of the clutch may be that the clutch becomes fully engaged.

If it is determined according to the invention that the vehicle is kept on an incline via an operation of the accelerator pedal or gas pedal of the vehicle and the threshold for energy input in the clutch has already exceeded a prescribable threshold value or threatens to exceed it, then, for example, the clutch may be engaged after a corresponding indication to the driver. The driver warning output before the clutch is engaged may possibly lead to a change of the driver's behavior such that he no longer depresses the accelerator pedal, so that the engine torque output by the engine drops, and since the energy input into the clutch is reduced so that a protection of the clutch by engagement of the clutch no longer must be implemented because, within the context of monitoring whether the determined driving situation is still applicable, it was determined that this is no longer the case and, on the other hand, the situation "creeping on an incline" while the vehicle is stationary has now occurred, and the previously described targeted interventions in the vehicle management are carried out.

If within the context of the method of the invention it is determined on the basis of, for example, the evaluation of available vehicle parameters that the vehicle is in a starting off operation and for this purpose the accelerator pedal is strongly depressed by the driver in order to achieve a high acceleration of the vehicle from a standstill, then this leads—in a clutch that is already greatly heated—to an increased energy input in the clutch, the driving-situation-dependent energy input threshold is exceeded and the clutch is engaged, which is possible even without creating a safety-critical situation because of the evaluation of the accelerator pedal angle and the determination of the corresponding driver desire.

If the determination of the driving situation of the vehicle provided by the invention reveals a starting operation against the service and/or parking brake of the vehicle (stall), then this may lead to various targeted interventions in the driving management as a function of additional determined vehicle parameters, for example, a disengagement of the clutch, which is not safety-critical since the vehicle brake is operated anyway, or even for this purpose the engine, for example, is shut down or stalled via an intervention in the engine management, this being possible also in conjunction with a corresponding indication to the driver. Also, as a possible alternative to stalling the engine, merely an intervention in the engine management may take place in connection with a reduction of the drive torque output by the engine.

If, according to the method of the invention and within the context of determining the driving situation of the vehicle, a "driving in gear" is determined as well as an increase of the slip speed, then it may be concluded that the clutch is slipping because of faulty torque tracking and an intervention in the vehicle management occurs in the form of an instruction to the clutch controller to engage the clutch further.

The invention will be explained in further detail below in reference to an example.

The energy input threshold is a function of parameters, such as the vehicle mass and the maximum available engine torque, and additional parameters, such as the roadway incline, the level of starting speed, etc. If, just as an example, a vehicle with a maximum engine torque of 200 Nm and a mass of 1,300 kg is considered, then in a full-load start with a starting speed of approximately 2,000 rpm on level road, an expected energy input of approximately 25 kJ may be assumed, which in a different driving situation, such as starting off under a full load and up an incline of approximately 20%, may amount to even more than 100 kJ. As was already mentioned previously, energy input threshold values may also be determined as a function of the calculated or measured clutch temperature. Now, if in the aforementioned example of the vehicle starting out on level road at a clutch temperature of approximately 250 degrees Celsius an expected energy input of up to 60 kJ is determined, then according to the method of the present invention a not-yet-critical load range of the clutch is determined, so that interventions in the vehicle management targeted toward load reduction do not have to occur. This energy input threshold drops as detected or calculated clutch temperature increases, so that at a clutch temperature of up to 350 degrees Celsius, for example, the energy input threshold drops to approximately 25 kJ, above which targeted interventions in the management of the vehicle are then carried out in order to reduce the load of the clutch. If the determined or calculated clutch temperature takes on a value of more than 350 degrees Celsius, then the energy input threshold is further reduced and takes on a value of, for example, 15 kJ, which when exceeded again triggers targeted interventions in the vehicle management, such as an intervention in the engine management for reducing the provided drive torque or a retraction of the clutch to terminate the slip condition.

The invention therefore provides a method for protecting an automatically actuated clutch of a vehicle from overload. Based on the determination of the driving situation, such as a creeping operation, a starting-off operation, a starting operation with the vehicle service brake or parking brake activated, the vehicle traveling or a shift operation, appropriate targeted interventions in the vehicle management for preventing or reducing the loading state of the clutch are brought about based on vehicle signals of the particular driving situation and the particular energy input in the clutch.

Regarding features of the invention that are not explained in detail above, refer specifically to the claims and the table.

What is claimed is:

1. A method for the protection of an automatically actuated clutch of a vehicle from overload, comprising:
    determining a driving situation of the vehicle;
    continuously determining the energy input in the clutch; and,
    preventing or reducing an overload state via targeted intervention in vehicle management as a function of the determined driving situation and the input energy, wherein various targeted interventions in the vehicle management are made as a function of prescribed threshold values of the energy input in the clutch or of the expected energy input, it being possible to calculate the threshold values as a function of the current temperature of the clutch.

2. The method as described in claim 1, wherein the step of determining the driving comprises making a distinction between at least the following situations: creeping, starting off and driving.

3. The method as described in claim 2, wherein the determination is carried out continuously.

4. The method as described in claim 2, wherein the determination is carried out intermittently.

5. The method as described in claim 2, wherein in the driving situation of starting off, a distinction is made between starting off when the vehicle is stationary and starting off when the vehicle is not stationary, and in this context the engaged drive position is detected.

6. The method as described in claim 1, wherein the energy input in the clutch is determined as the integral of the friction introduced in the clutch at any instant over time, according to the formula $E_{Friction} = \int P_{Friction}(t)dt$, wherein $P_{Friction}$, at any given time is a product of the current slip speed $\omega_{Slip}$ at the clutch and the current friction moment $M_{Friction}$ at the clutch, such that $P_{Friction} = M_{Friction}\omega_{Slip} = M_{Friction}2\pi n_{Slip}$.

7. The method as described in claim 6, to determine the energy input in the clutch, the friction moment is measured or calculated on the basis of clutch characteristic curves or is determined on the basis of the engine speed, the engine torque and a mass moment of inertia value.

8. The method as described in claim 1, wherein the interventions in the vehicle management are carried out as a function of prescribed threshold values of an expected period of a slip state of the vehicle clutch.

9. The method as described in claim 1, wherein the interventions in the vehicle management are carried out as a function of prescribed threshold values of the speed of the vehicle.

10. The method as described in claim 9, wherein an optic signal is output before the intervention in the vehicle management is carried out.

11. The method as described in claim 9, wherein an acoustic signal is output before the intervention in the vehicle management is carried out.

12. The method as described in claim 9, wherein a haptic signal is output before the intervention in the vehicle management is carried out.

13. The method as described in claim 10, wherein, before carrying out the intervention in the vehicle management, a prescribable waiting period is set during which the presence of the condition for the intervention continues to be checked.

* * * * *